United States Patent [19]

Penicaud

[11] 3,825,694

[45] July 23, 1974

[54] CONVERSATION DETECTOR FOR A TELEPHONIC CHANNEL CONCENTRATOR

[75] Inventor: Etienne Penicaud, Chaville, France

[73] Assignee: Compagnie Industrielle Des Telecommunications Cit-Alcatel, Paris, France

[22] Filed: Oct. 30, 1972

[21] Appl. No.: 301,734

[52] U.S. Cl. .......................... 179/15 AS, 179/15 AP
[51] Int. Cl. .............................................. H04j 5/00
[58] Field of Search ..................... 179/15 AP, 15 AS

[56] References Cited

UNITED STATES PATENTS 3,649,766 3/1972 La Marche .................... 179/15 AS
3,706,091 12/1972 May .............................. 179/15 AS
3,712,959 1/1973 Fariello .......................... 179/15 AS

*Primary Examiner*—Ralph D. Blakeslee
*Attorney, Agent, or Firm*—Craig & Antonelli

[57] ABSTRACT

The samples tapped from a telephone channel are weighted according to the amplitude of each of them and the rhythm of the changes in polarity, the device deducing a "note" therefrom for each sample, positive or negative, calculating the sum of all the cumulated notes and deciding "conversation activity" if the cumulated note exceeds a certain threshold, and "non-activity" if the note passes below a second threshold lower than the previous one.

7 Claims, 6 Drawing Figures

CONVERSATION DETECTOR FOR A TELEPHONIC CHANNEL CONCENTRATOR

The invention comes within the branch of techniques tending to increase the rate of use of expensive telephonic circuits (for example sub-marine cables) of the four-wire type, by changing the attribution of one channel as soon as the person to whom it was attributed stops speaking to allow the other correspondent to speak during a conversation. To proceed with such a change in attribution, an appropriate element or conversation detector must decide if the correspondent in question is speaking or not. As various noises, pulses, etc., always exist on telephonic circuits, the action of the conversation detector must satisfy specific criteria, enabling conversation to be infallibly distinguished from noise. The object of the invention, which is used in telephone exchanges in which line concentrators of the above-mentioned type are installed, corresponds to this aim.

The problem of the conversation detector for a telephonic channel concentrator is not new, and solutions have already been found for it, with reference more particularly to the article in the Bell System Technical Journal of July, 1962, "Tasi Quality".

The present invention requires a much smaller number of components than the known solution and enables, more particularly, on account of its embodiment, a great number of channels to be handled for a single conversation detection unit.

The basic idea of the invention consists in giving to each sample of the signal (tapped every 125 $\mu$s), an overall note N*g*, formed by two elementary notes: a double polarity change note N*p*, and an amplitude note having an absolute value N*a*, the latter having the − sign assigned to it at low levels, and in proceeding with the addition of the overall notes of the successive samples to obtain thus a "cumulated note N*e*", on condition that once a certain pre-determined value of the cumulated note, taken as a maximum limit, is reached, it is decided that the circuit is in a state of activity, until the cumulated note has returned to zero, the activity period being systematically extended by a hold period, which may assume various values according to the length of the activity period.

It will be shown that the introduction of the double polarity change note enables the weighting of a certain frequency range which exists in the voice spectrum with a greater weight, and is less frequently present in noises. Such a system is therefore well-adapted to the distinguishing between conversation sounds and noises.

Moreover, the adding of a hold period has the effect of preventing a correspondent from being unduly deprived of a circuit when he has not finished speaking, but has stopped for a short instant between two words or two syllables of a word.

The invention will be described in detail with reference to the accompanying drawing file, in which:

FIGS. 1, 2 and 3 show, in a particular case, as a function of time, the variation of the acoustic frequency current existing on a determined circuit, and of various signals and magnitudes, leading to the determining of a period known as an activity period, during which the conversation detector decides that a conversation is taking place, this conversation being extended by a hold period. FIG. 1 shows the complete evolution of the currents, signals and magnitudes, during a certain interval of time. FIGS. 2 and 3, on enlarged scales, the evolution of certain of the magnitudes, respectively during two partial intervals considered as being more representative. In the three figures, the same lines and graphs are indexed by the same numerals from *a* to *s*;

Figure 1:
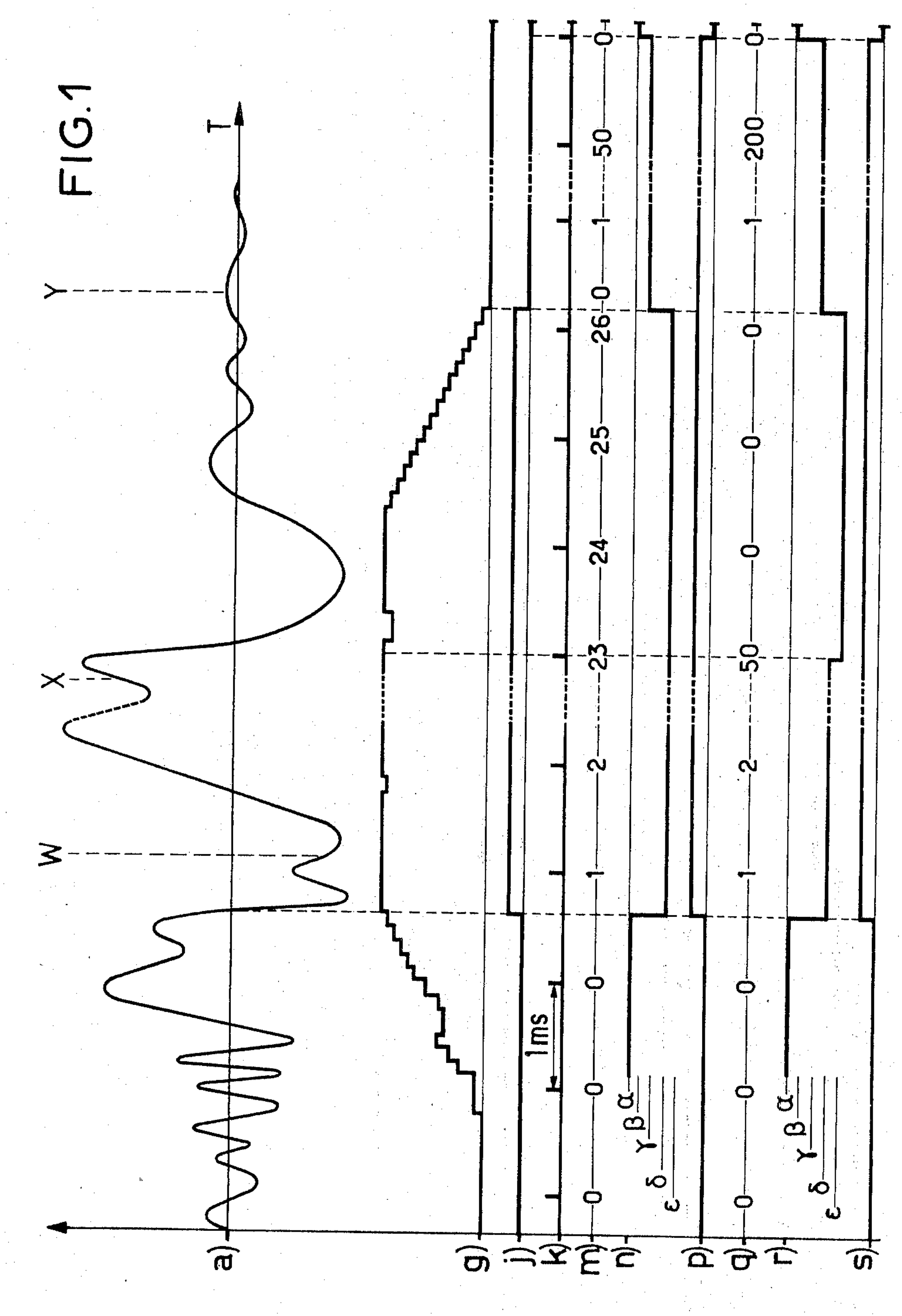
Figure 2:
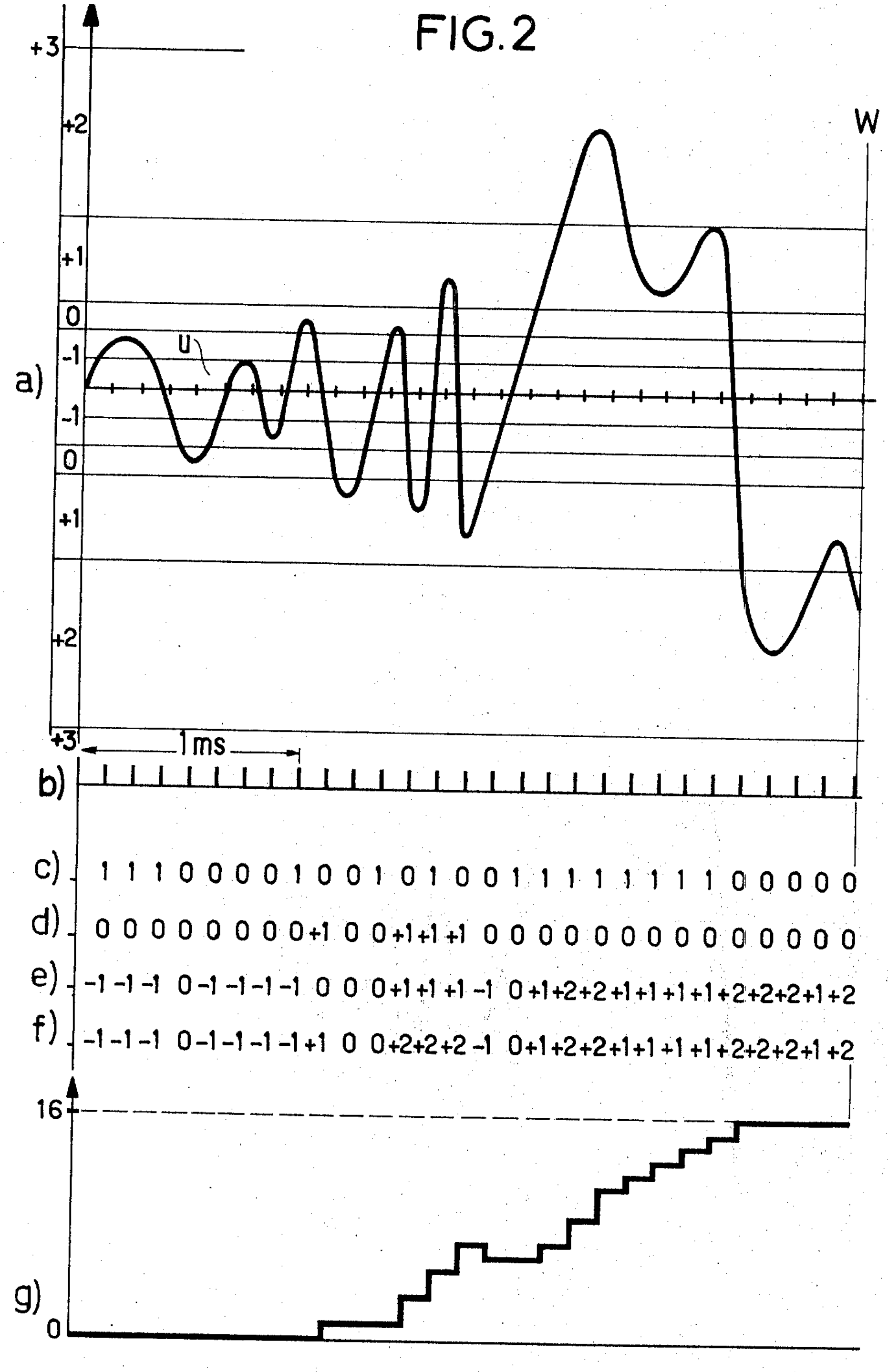
Figure 3:
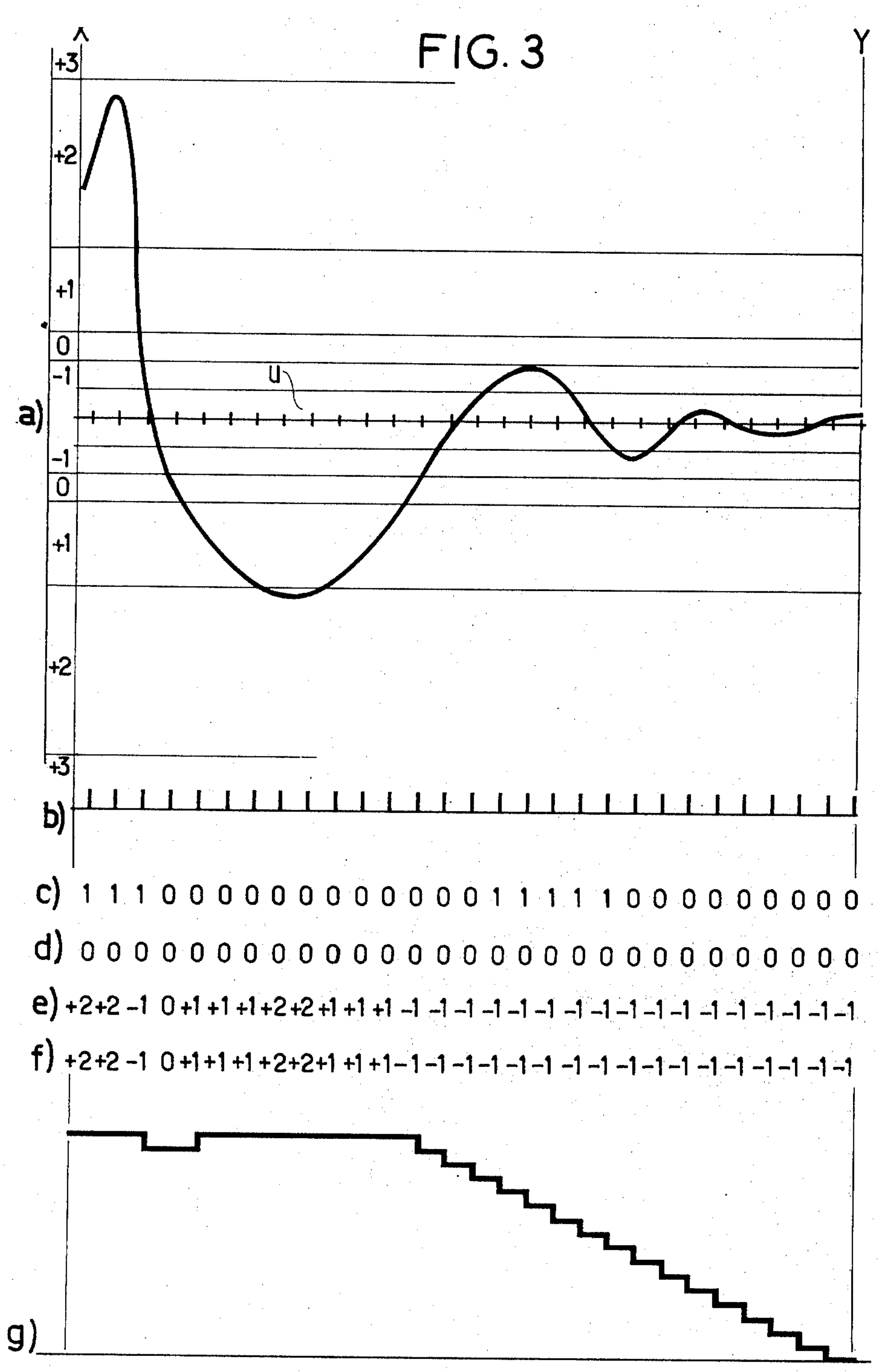

FIGS. 1, 2, 3 — The graph shows the variation of the acoustic frequency current on a telephonic circuit given between a starting point and a period T. Two sub-intervals have been made out of that interval: the first begins at the starting point, and is defined by a straight discontinuous line W; the second is defined by two straight discontinuous lines X and Y.

A level index scale has been referenced in a left-hand column, in FIGS. 2 and 3 and marked by horizontal straight lines. That scale is chosen at random and has been given merely by way of example, the scale adopted finally being dependent on practical results, and possibly varying from one case to another.

The scale is symmetrical in relation to the zero axis. In the vicinity of the zero axis, a range of low levels is indexed −1. Then the indexed ranges 0, +1, +2, +3, for example are attributed to the increasing levels. Within the scope of the invention, the ranges on successive levels could be indexed by other numerals, for example, 2, 5, 10 . . .

From the symmetry of the scale in relation to the zero axis, it is, of course, deduced that the amplitudes are indexed in the same way, whatever their polarity may be.

In the range of low levels indexed −1, there is, more especially, a sub-range marked *u*, in the immediate vicinity of the zero axis, referencing the lowest levels. The sub-range *u* is not used for indexing the levels; it is used for referencing the changes in polarity. This notion will be specified below.

The graph *b* shows an indefinite sequence of sample tapping instants on the current shown by the graph *a*. The intervals between tappings will be taken, preferably, equal to 125 microseconds (frequency = 8 k c/s), standardised value for a PCM (pulse code modulation) frame.

The sign of the successive samples has been marked on the line *c*. The samples tapped are, of course of + or − polarity: within the scope of logic data processing, the convention adopted is: 1 for the + polarity, 0 for the − polarity. The following convention has also been adopted: when the amplitude of a sample is placed in the range 11, the signal of the preceding sample is maintained, even if, in reality, the polarity is reversed. The effective signal is thus obtained. The double polarity change N*p* note has been inserted on the line *d*. The following convention has been adopted in the present case for that note N*p*: at a random sampling instant, the three samples of the three successive instants, to, $t_{-1}$, $t_{-2}$, are considered. The change in polarity (1) at to is observed for a sequence:

| $t_{-2}$ | $t_{-1}$ | to |
|---|---|---|
| 1 | 0 | 1, or: |
| 0 | 1 | 0. |

In all the other cases (000, 001, 011, 111, 110, 100), an absence of the double change in polarity (0) is observed.

The indexing of the double change in polarity may be effected by another note than 1, taken here by way of example.

The reason for that convention is as follows:

It is easy to observe that, for a current having a frequency comprised between 2 kc/s and 4 kc/s, a certain proportion of 101 or 010 sequences among the eight possible sequences will be obtained. That proportion increases linearly from 2 to 4 kc/s. Below 2 kc/s, these two sequences never appear. According to the invention, the components of the acoustic spectrum situated in the 2 to 4 kc/s range, which figure in noises more rarely than in the voice spectrum are more intensely weighted.

The line *e* comprises the amplitude notes N*a:* they are deduced immediately from the horizontal lines of the graph *a*. Indexing the low levels with −1 is justified by the fact that it ensures a return to zero of the cumulated note for a sequence of low levels as will be seen below.

The line *f* has the overall note N*g* = N*p* + N*a*.

The graph *g* has the evolution of the cumulated note N*c* = N*g*. At each instant, the cumulated note is obtained by effecting the algebraic sum of the preceding cumulated note (N*c*) and of the new overall note (N*g*). The cumulated note N*c* has an upper limit at 16, a value chosen at random and given by way of example: when the cumulated note has reached the level 16 in the present case, a positive value of the overall note N*g* is no longer taken into account. On the other hand, a value of N*g* equal to −1 is immediately counted. 16 successive samples having slight amplitude, indexed −1, covering a duration of 2 ms, bring the cumulated note N*c* back to zero.

The following limits and graphs have been included only in FIG. 1.

The graph *j* marks the activity period A: the activity begins at the instant when the cumulated note N*c* (graph *g*) reaches, for the first time, the value 16 after a period of non-activity, and ends at the instant when the cumulated note returns to zero. If changes to a value lower than 16 occur, as may be observed on two occasions in the graph *g*, activity is maintained, only the return to zero putting an end thereto.

The line *k* has an indefinite sequence of reference instants, spaced 1 millisecond apart (this being the duration of eight elementary PCM intervals).

The following lines *m, n, p, q, r, s*, refer to the determming of the hold period, which is joined on at the end of the activity period. The first three (*m, n, p*) concern the short hold period (about 50 ms); the last three concern a long hold period (about 200 ms).

The line *m* shows the states of a counter for intervals spaced 1 millisecond apart, which is blocked and marks zero during a non-activity period, and begins to count starting from the first reference instant which follows the arrival of the cumulated note N*c* at 16. If the activity A returns to zero before the counter has reached 50, then the return of A to zero brings the counter back to 0, then the counter begins counting again, starting at 0; this is the beginning of the hold M. The counter now counts up to 50, then at the reference instant following the state 50, it returns to the state 0; this is the end of the hold M.

The graph *n* comprises horizontal segments referenced from the left-hand end corresponding to five possible states of the telephonic circuit concerned.

$\alpha$ Inactivity since a time greater than the hold;

$\beta$ Short hold;

$\gamma$ Long hold;

$\delta$ Activity since less than 50 ms;

$\epsilon$ Activity since more than 50 ms.

In the present case, of short hold time, there is a first segment whose level is $\alpha$ (inactivity since a time greater than the hold), a second segment whose level is $\delta$ (activity since less than 50 ms), a third segment whose level is $\beta$ (hold period in the order of 50 ms), a fourth segment whose level is $\alpha$.

The graph *p* shows the total duration of the conversation time recognised on the circuit in question, that is, A + M.

The line *q* refers to the case where the activity A lasts longer than 50 ms: in that case, when the counter reaches 50, the activity still lasts. According to the line *q*, the counter, once it has reached 50, marks zero during the whole remainder of the duration of the activity period. Then it begins to count up to 200 when the activity A has returned to zero: this is the beginning of the long hold, corresponding to an activity having lasted more than 50 ms. When the counter has reached 200, it returns to 0, and at that instant, the long hold comes to an end. These occurrences are marked on the graph *r*, which comprises the five levels $\alpha$, $\beta$, $\gamma$, $\delta$, $\epsilon$, defined above, corresponding to five possible states of the telephonic circuit. In the present case, there is firstly a first segment whose level is $\alpha$, a second segment whose level is $\delta$ (activity since less than 50 ms), which is immediately followed by a third segment whose level is $\epsilon$ (activity lasting more than 50 ms), a fourth segment whose level is $\gamma$ (long hold), a fifth segment whose level is $\alpha$.

Lastly, the graph s shows the sum of the two periods of duration, A + M = W, in the case of the long hold.

It is stated for reference that all the articulated numerical values in the preceding description are given only by way of example, as is the case with the number and the width of the noting scales included in the figures.

The invention covers also all variations of the same principle, for example a variation according to which the hold period is determined by means of pulses spaced 20 ms (I1) apart and pulses spaced 12.5 ms (I2) apart, with a rise of the cumulated note to 16 if the third pulse I1 arrives before the cumulated note has returned to zero, and a lowering of one unit at each pulse I2, that is, 16 pulses spaced 12.5 ms apart, in other words, hold period of 12.5.16 = 200 ms.

Likewise, the law adopted for the hold period is only one solution among many other possible solutions, in the same principle, establishing another law of correlation between the duration of the hold period and the duration of the activity.

All these variations, which differ in the value of the parameters, but which proceed from the same principles, come essentially within the scope of the invention.

Figure 4:
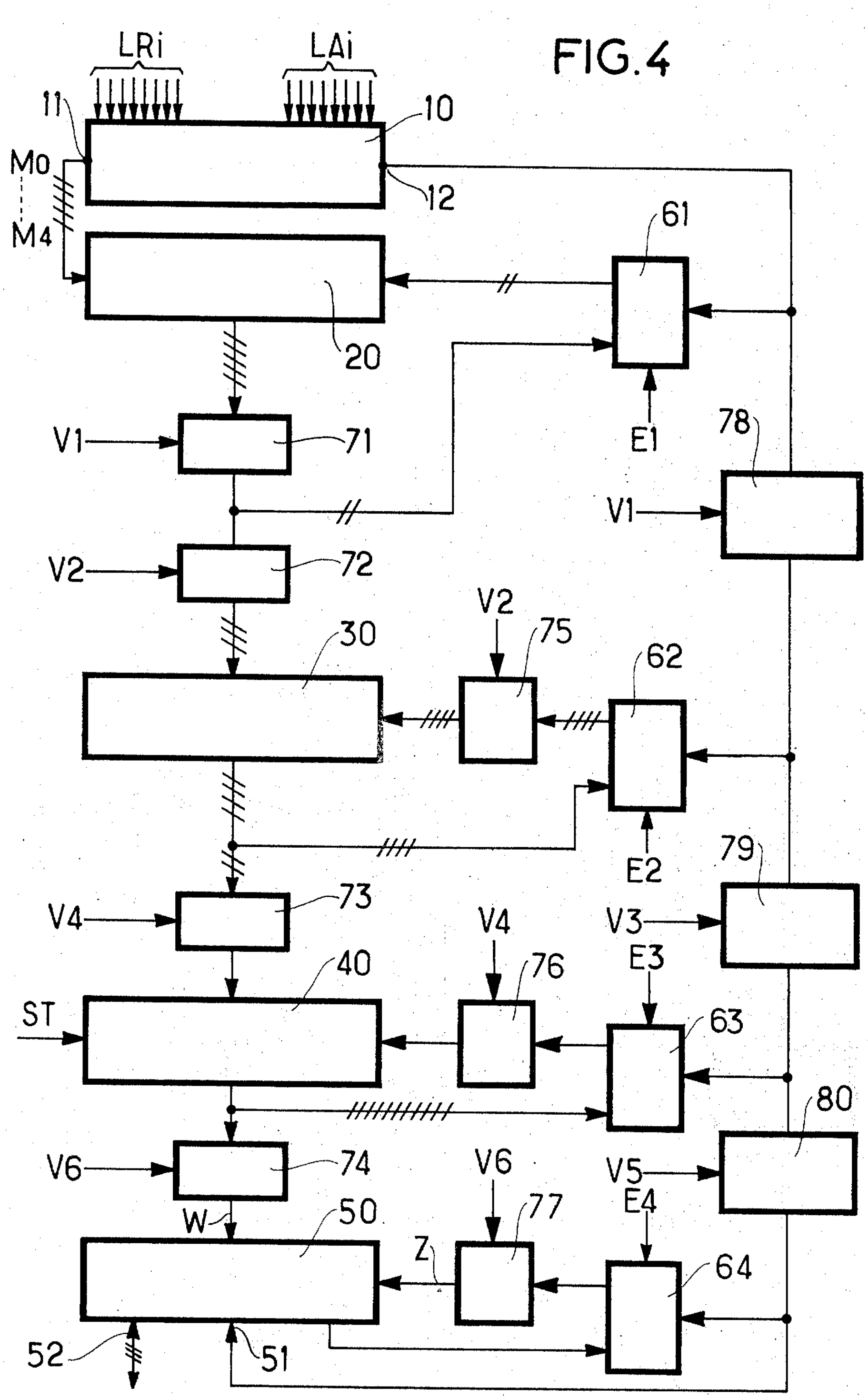
FIG. 4 is a block diagram of an installation using, as a criterion for the detection of conversation, the evaluating of the cumulated note defined above.

FIG. 4 — FIG. 4 is an overall block diagram showing the organisation of the circuits for calculating the cumulated note and determining the interval of the time period (A) + hold period (M). Herebelow, it is assumed that $A + M = W$.

In actual fact, use is made of a small fixed logic cabled circuit type computer, operating on logic signals receiving the conversation data in the form of levels quantified by pulse code modulation (conversation octets) capable of processing, in a PCM multiplex circuit, 256 circuits, and effectively processing 240 thereof, cooperating with an external calculator which is in charge of assigning the multiplex telephonic channels to the various correspondents.

The device comprises essentially an input sub-assembly 10, with outputs 11 and 12, a sub-assembly 20 for determining the effective sign and calculating the overall note Ng, a sub-assembly 30 for adding the present overall note to the former cumulated note, giving the present cumulated note, a sub-assembly 40 for calculating the hold period, a sub-assembly 50 for connecting up to the coupling of the external calculator.

The device comprises furthermore a certain number of elements memorising quantities used on a transitory basis in calculations: element 61 memorising 256 words of two bits for two previous effective signs, $S_{-1}S_{-2}$; element 62 memorising 256 words of four bits for the cumulated note; element 63 memorising 256 words of eleven bits for the interval W and the state of the circuit; element 64 (256 words of 1 bit) memorising the last state 2 transmitted to the coupling.

It comprises buffer memories: 71 having 5 bits, at the output of the sub-assembly 20; 72 having 3 bits, between the buffer memory 71 and the sub-assembly 30; 73 having 2 bits, between the sub-assembly 30 and the sub-assembly 40; 74 having 1 bit, between the sub-assembly 40 and the sub-assembly 50; 75 having 4 bits between the element 62 and the sub-assembly 30; 76 having 11 bits between the element 63 and the sub-assembly 40; 77 having 1 bit, between the element 64 and the sub-assembly 50.

Lastly, it comprises, moreover, three buffer memories 78, 79, 80 for addresses of 12 bits each, in series between the output 12 of the sub-assembly 10 and an input 51 of the sub-assembly 50; 71 co-operates with 61, 78 co-operates with 62, 79 co-operates with 63, 80 co-operates with 64 and 50.

Figure 6:
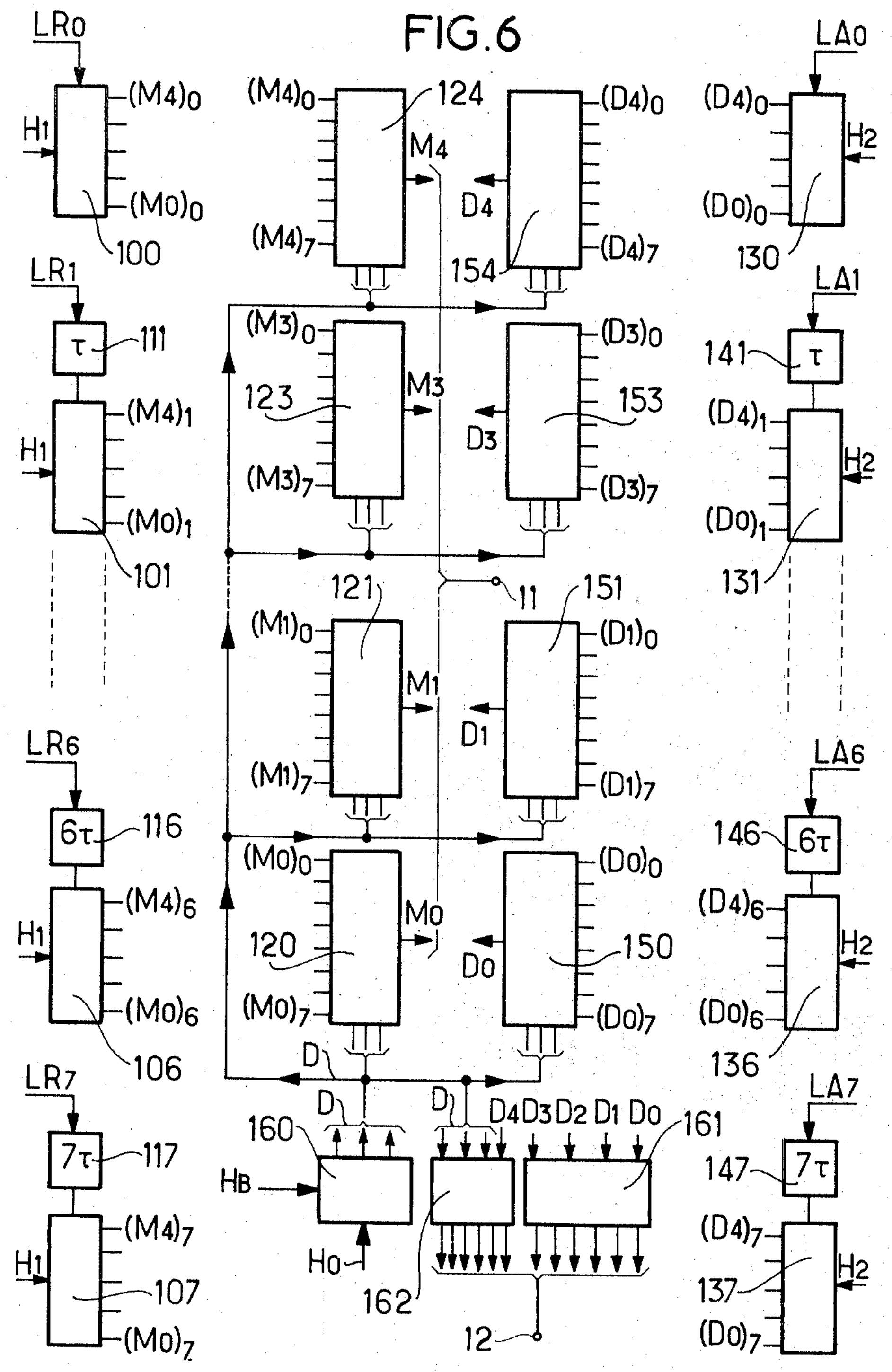
FIG. 6 is a more detailed diagram of a portion of the diagram according to FIG. 4.

A more detailed diagram of the sub-assembly 10 is given in FIG. 6. The sub-assemblies 20, 30, 40 are, to great advantage, constituted in "dead memories". It is stated for reference that a dead memory is a memory which comprises records made permanently when the device was manufactured, and from which it is possible only to read (this is called a "read only memory"). Reading is effected as a function of the input parameters. Such a component is supplied by various integrated circuit manufacturers. The operation of the various elements in FIG. 4 will be explained below.

Sub-assembly 10 — LR*i* refers to a distributing network line No *i* to which the conversation octets are connected in series. LAi is the wire by which the bits of the address (or number of the low frequency circuit from which the processed conversation octet has been sampled), are connected in series.

An address having 5 bits and a conversation octet having 8 bits (1 sign bit, 7 amplitude bits), the binary outputs of LAi and of LRi controlled by clocks H2 and H1 respectively are in a ratio of 5 : 8.

A sign bit M*o* and four heavy weight amplitude bits from the group of 7 bits defining the amplitude of the conversation sample leave the sub-assembly 10 through the output 11; 12 bits obtained by the partial decoding of the address of the sample being processed leave through the output 12.

Sub-assembly 20. The processing effected by that element is brought down to a transcoding having seven (or eight) input variables and five output variables. That element having seven (and sometimes eight) input variables in parallel: M0, M1, M2, M3, M4 received from 10, $S_{-1}$, $S_{-2}$ received from 61 effective signs determined when the two processing operations preceding the processing operation being effected; possibly, an extra variable (G) (not shown) which comes into play if the level on the return circuit connected with the circuit processed is taken into consideration.

The sub-assembly 20 having five output variables in parallel: 3 bits defining the overall note N*g* (3 bits are sufficient for defining eight distinct notes), 2 bits, So and $S_{-1}$ to be stored in the memory 61 for subsequent processing.

In actual fact, the scale taken as an example (FIGS. 2 and 3) comprises five distinct notes, as shown by the table below, which shows the value of N*g* as a function of N*a* and of N*p*.

| | | Na | | | |
|---|---|---|---|---|---|
| | | −1 | 0 | +1 | +2 |
| Np | 0 | −1 | 0 | +1 | +2 |
| | 1 | 0 | +1 | +2 | +3 |
| | | | | Ng | |

If $N_p$=0, Ng=Na; If $N_p$=1, Ng=Na+1.

The five output bits are received by the buffer memory 71 which shunts the two sign bits towards the element 61 and makes the other three transit through the buffer memory 72.

Sub-assembly 30. The processing operation effected by that sub-assembly is brought down to a transcoding having seven input variables and six output variables.

At the input, there are 3 bits for the overall note N*g*, received from 72, 4 bits for the preceding cumulated note $(Nc)_{-1}$, received from 75.

At the output, there are 6 variables: K1 (upper stop of the cumulated note N*c*) K*o* (lower stop of the cumulated note), plus 4 bits for the new cumulated note (N*c*)*o*. These latter are received by the element 62; the other two transit through 73.

Sub-assembly 40. The processing operation effected by that sub-assembly is again a transcoding having 14 input bits and 12 output bits.

The 14 input bits are: ST (PCM super-frame of 1 millisecond) K*o* and K1 (see above) received from 73, 3 bits for defining the state of the circuit (five distinct states) and 8 bits for counting the milliseconds from 0 to 200, which is 11 bits received from 76.

The 12 output bits are: 3 state bits, 8 time bits, one activity bit W.

Sub-assembly 50. The sub-assembly 50 to be connected up to the coupling of the calculator (input-output circuit) does not exactly form a part of the conversation detector which is the object of the invention. It will not be described in detail, only its operation will be set forth.

The sub-assembly receives, from the conversation detector: the bit W, the address of the circuit to which that bit corresponds, the last state of the conversation circuit concerned (variable Z) transmitted to the coupling. It receives, at 51, an address coming from the element 64.

That sub-assembly transmits only changes in states, not the states themselves, this having the effect of considerably slowing down its operation.

It effects the following functions:

If W = Z: no operation.

If W ≠ Z: an attempt is made to transmit to the calculator (through the coupling) the new state of W. If the coupling (busy transmitting another data item to another circuit, to a test . . . ) is not available and cannot transmit the new value of W, the new value of W and the processing operation stop at that point.

If the coupling is available, it deals with the new value W and sends out an acknowledgement of receiving over a special wire (terminal 52). Having received that acknowledgement of receiving, the sub-assembly brings the value of the variable Z to be memorised, up to date.

The line 52 with two arrows symbolises the sending of tne new value W to the coupling (not shown) and the return of the acknowledgement of receiving.

Besides their memory function, the elements 61, 62, 63, 64, effect the decoding of the address which comes from the terminal 12 of the element 10 in the partially decoded state.

Figure 5:
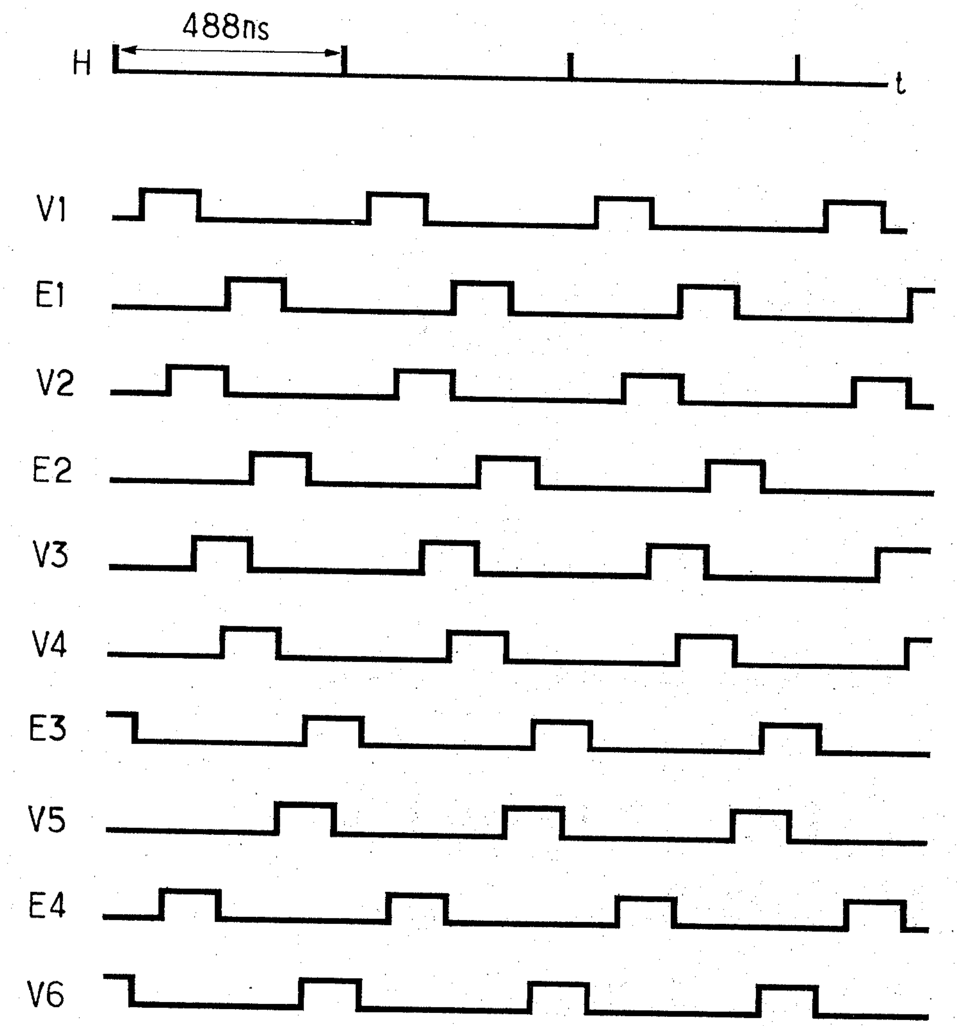
FIG. 5 is a table of graphs showing control signals of an assembly according to FIG. 4.

The rhythm signals $V_1 \ldots V_6$, $E_1 \ldots E_4$ are described in FIG. 5.

FIG. 5. FIG. 5 is a table showing the inter-relation between the signals giving the operation rhythm of the various elements in FIG. 4.

The state of the periods t marked at the top shows that all the control signals have a rhythm at the period T = 488 ms by a clock H (not shown).

That period is the quotient of the basic PCM sampling period (125 $\mu$s) by 256: in a time equal to the basic period, 256 circuits are processed.

The signals V1, V2, V3, V4, V5, V6 control respectively the elements (71 + 78), (72 + 75), 79, (73 + 76), 80, (74 + 77).

The signals E1, E2, E3, E4 control respectively the elements 61, 62, 63, 64.

These signals are obtained from the signals H by known means.

FIG. 6. FIG. 6 is a general diagram of the input subassembly 10 (FIG. 4).

It comprises, for eight distributing network lines LR0 to LR7, eight shift registers 100 . . . 107. These registers derive their rhythm from a clock H1 which is in relation with HB (bits clock of a PCM transmission, whose standardised value is 2.048 megabits per second).

The arrival of data is delayed by $\tau$ for the register 101 . . ., by $6\tau$ for the register 106, by $7\tau$ for the register 107, by delay lines 111 . . . 116, 117 respectively.

A bit whose sign is M*o*, corresponding to the distribution network line LR*o*, that is, (M*o*)*o*, and four amplitude bits (M1)*o* . . . (M4)*o* are collected on five outputs of the register 100. The PCM amplitude tapping comprises eight bits, of which only the four bits having the heaviest weight are kept.

Likewise, a bit whose sign is (M*o*)1 and four amplitude bits (M1)1 . . . (M4)1, corresponding to the distribution network line LR1, is applied to the five outputs of the register 101, and so on, up to the register 107 corresponding to the distribution network line LR7.

The diagram comprises eight shift registers 130 to 137, equipped with delay lines 141 . . . 147 which derive their rhythm from a clock H2, which are, moreover completely identical to the registers 100 . . . 107, receiving the corresponding addresses coming in over eight lines LA*o* . . . LA7. There are five address bits for the line LA*o* (register 130): (D*o*)*o* . . . (D4)*o*, etc., up to register 137 for the line LA7.

The elements 120 . . . 124 are selectors having eight inputs and one output. For example, the selector 120 receives on its eight inputs the eight bits (M*o*) *o* . . . (M*o*)7, and supplies, at the output, one bit M*o*, which is applied to the output terminal 11 (see FIG. 4) with a view to processing in the other sub-assemblies.

The selectors 120 . . . 124 derive their rhythm from the states of a modulo 8 counter, reference 160, which receives a clock pulse HB having a standardised "PCM frequency" that is, 2.048 megabits per second, and being reset to zero by conversation octet frequency pulses, that is, H*o* = HB/8. The counter 160 supplies three bits designated by D. It is stated for reference that a PCM multiplex or "train" comprises 30 telephonic channels, and that a PCM system comprises eight trains. The number displayed by the counter 160 is the number of a particular train.

The arrangement is exactly the same for the selectors 150 to 154, which extract respectively, from the outputs of the registers 130 to 137, the address bits D*o* . . . D4.

A complete address comprises the five bits mentioned previously D*o* . . . D4, plus the three bits D supplied by the counter 160; these eight bits arrive, in groups of four, at two transcoder elements: 161 (D*o* to D3), 162 (D4 and the three bits D). 12 partially coded address bits leave through the terminal 12 (see FIG. 4). This change to 12 bits does not have any particular logic significance; it is due to the technology used, based on integrated circuits supplied from industrial sources.

I claim:

1. A conversation detector for a telephonic channel concentrator including means for sampling a plurality of telephonic channels at a regular frequency, said detector comprising first means for generating a binary signal 1 when the telephonic sample has a positive polarity and a binary signal zero when the telephonic sample has a negative polarity, second means responsive to said first means for generating a binary signal 1 only when the telephonic sample and the two preceding samples have a sequence of binary signals 0–1–0 or 1–0–1 and for generating a binary signal zero for all other signal combinations, third means for detecting the amplitude of said telephonic samples with respect to *n* subranges of amplitudes each having a respective value, fourth means for adding the outputs of said second and third means for each sample, fifth means for accumulating the outputs of said fourth means for successive samples, and sixth means for indicating when the accumulated value in said fifth means is at a predetermined level, said third means being responsive to amplitude ranges of − 1 in a range on either side of a mean value and ranges of increasing positive value beginning with a zero range beyond each − 1 range.

2. A conversation detector as defined in claim 1 further including seventh means for generating an activity period signal for the duration the output of said sixth means reaches said predetermined level to the time it returns to zero.

3. A conversation detector as defined in claim 2 wherein eighth means is provided for maintaining the signal generated by said seventh means for a hold period following the duration of the output of said seventh means.

4. Conversation detector according to claim 1, characterized in that said third means is not responsive to a change in polarity for an amplitude sample lower than the limit of the range noted −1.

5. Conversation detector according to claim 3, characterised in that it contains four main sub-assemblies: an input sub-assembly effecting the sorting out and the selection of the address bits and the sign and amplitude bits of the samples tapped from a circuit to be processed, retaining only the heavy amplitude bits, a second sub-assembly establishing the effective sign of the sample and calculating the overall note, a third sub-assembly supplying the cumulated note producing the upper and lower stops, a fourth sub-assembly effecting the processing relating to the hold period, as well as a fifth auxiliary sub-assembly ensuring the exchanges with an input coupling of an external calculator, buffer memories between the second and third sub-assemblies, between the third and fourth sub-assemblies between the fourth sub-assembly, four memorising elements, also equipped with address decoding means, the first co-operating with the second sub-assembly, memorising two signs of samples previous to the sample being processed, the second, co-operating with the third sub-assembly, memorising the cumulated note, the third co-operating with the fourth sub-assembly, memorising the period and the state of the circuit, the fourth, co-operating with the fifth sub-assembly, memorising the last state transmitted to the coupling, the said elements receiving the output data of the corresponding sub-assembly, and on the other hand, partially decoded address bits coming from the first sub-assembly through buffer memories in series, and supplying their data to the corresponding sub-assembly through a buffer memory, exclusive of the first.

6. Conversation detector according to claim 5, characterised in that the said first sub-assembly comprises a counter used for referencing a circuit in a pulse code modulated train, a first series of shift registers receiving the sign and amplitude bits of a certain number of distribution network lines, a second series of shift registers receiving the partially decoded address bits of the distribution network lines, a first series of selectors sorting out the sign and amplitude bits according to the states of the said counter and applying them to the input of the second sub-assembly, a second series of selectors sorting out the address bits according to the states of the counter, a second series of selectors sorting out the address bits and applying them to a transcoder which receives also the states of the said counter, the output of the said transcoder being connected to an input of the said memorising elements, possibly through buffer memories.

7. Conversation detector according to claim 5, characterised in that the processing sub-assemblies, exclusive of the first sub-assembly, are constituted by dead memories equipped so as to effect transcoding operations according to the functions described.

* * * * *

UNITED STATES PATENT OFFICE

CERTIFICATE OF CORRECTION

Patent No. 3,825,694 Dated July 23, 1974

Inventor(s) Etienne Penicaud

It is certified that error appears in the above-identified patent and that said Letters Patent are hereby corrected as shown below:

Title page, insert the following:

[30] Foreign Application Priority Data

October 29, 1971 France ... EN 71 39 022

Signed and sealed this 22nd day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334